(12) United States Patent
Nishida et al.

(10) Patent No.: US 11,323,586 B2
(45) Date of Patent: May 3, 2022

(54) READING DEVICE, OUTPUT APPARATUS, AND IMAGE FORMING APPARATUS

(71) Applicant: FUJIFILM Business Innovation Corp., Tokyo (JP)

(72) Inventors: Yoji Nishida, Kanagawa (JP); Hiroshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/118,562

(22) Filed: Dec. 10, 2020

(65) Prior Publication Data

US 2021/0368058 A1 Nov. 25, 2021

(30) Foreign Application Priority Data

May 22, 2020 (JP) .............................. JP2020-089543

(51) Int. Cl.
*H04N 1/028* (2006.01)
*H04N 1/193* (2006.01)
*G02B 7/182* (2021.01)

(52) U.S. Cl.
CPC ......... *H04N 1/1937* (2013.01); *H04N 1/0284* (2013.01); *G02B 7/1821* (2013.01); *G02B 7/1822* (2013.01)

(58) Field of Classification Search
CPC ............................ G02B 7/1821; G02B 7/1822
See application file for complete search history.

(56) References Cited

U.S. PATENT DOCUMENTS

| 2006/0215933 | A1* | 9/2006 | Nakaya ..................... H04N 1/03 382/294 |
| 2007/0091465 | A1* | 4/2007 | Ichikawa ................ G02B 26/10 359/726 |
| 2007/0165286 | A1* | 7/2007 | Endo ....................... G07D 7/121 358/474 |
| 2009/0237748 | A1* | 9/2009 | Yabuta ................... H04N 1/1017 358/474 |
| 2010/0110505 | A1* | 5/2010 | Maruyama ......... H04N 1/02815 358/475 |
| 2012/0162738 | A1* | 6/2012 | Allen ................ G03G 15/04036 359/212.1 |

(Continued)

FOREIGN PATENT DOCUMENTS

| AU | 2010201056 A1 * | 2/2011 | ......... H04N 1/02815 |
| CN | 112543258 A * | 3/2021 | ........... H04N 1/0305 |

(Continued)

*Primary Examiner* — Ted W Barnes
(74) *Attorney, Agent, or Firm* — JCIPRNET

(57) ABSTRACT

A reading device includes an emission unit that emits light; a first reflecting unit having a first reflecting surface that reflects the light emitted by the emission unit toward a document; a second reflecting unit having a second reflecting surface that reflects the light reflected by the first reflecting unit and specularly reflected by the document; a first support unit that supports the first reflecting unit and the second reflecting unit and fixes a relative position and a relative orientation between the first reflecting surface and the second reflecting surface; and a second support unit that supports the first support unit such that at least one of a position and an orientation of the first support unit is adjustable.

20 Claims, 6 Drawing Sheets

(56) References Cited

U.S. PATENT DOCUMENTS

| | | | |
|---|---|---|---|
| 2012/0307322 A1* | 12/2012 | Ozawa | H04N 1/0287 358/475 |
| 2013/0271975 A1* | 10/2013 | Cui | H04N 1/02865 362/232 |
| 2014/0226191 A1* | 8/2014 | Enomoto | H04N 1/00591 358/496 |
| 2015/0055195 A1* | 2/2015 | Suto | H04N 1/02815 358/475 |
| 2015/0365556 A1* | 12/2015 | Imoto | H04N 1/02895 358/475 |
| 2017/0064124 A1* | 3/2017 | Yoshida | H04N 1/0057 |
| 2018/0262638 A1* | 9/2018 | Ohzawa | H04N 1/0306 |
| 2021/0185180 A1* | 6/2021 | Hill | H04N 1/0314 |

FOREIGN PATENT DOCUMENTS

| | | | |
|---|---|---|---|
| JP | 2010-130444 | 6/2010 | |
| WO | WO-9419908 A1 * | 9/1994 | H04N 5/2354 |

* cited by examiner

READING DEVICE, OUTPUT APPARATUS, AND IMAGE FORMING APPARATUS

CROSS-REFERENCE TO RELATED APPLICATIONS

This application is based on and claims priority under 35 USC 119 from Japanese Patent Application No. 2020-089543 filed May 22, 2020.

BACKGROUND i) Technical Field

The present disclosure relates to a reading device, an output apparatus, and an image forming apparatus.

ii) Related Art

Japanese Unexamined Patent Application Publication No. 2010-130444 describes a reading device including a second emission unit that emits light for receiving a portion of a specularly reflected light component from a document. The light emitted from the second emission unit is incident on the document at an angle that is not 0 degrees with respect to a reflection angle of a principal ray of specularly reflected light guided toward a light guiding unit.

SUMMARY

A light directing unit may be provided to direct light toward a reading region, and a light guiding unit may be provided to guide light reflected by the reading region. When the relative position between these units is even slightly shifted upon reception of specularly reflected light, the image quality will be changed.

Aspects of non-limiting embodiments of the present disclosure relate to facilitation of positioning of reflecting units that reflect light before and after the light reaches a reading region.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading device including an emission unit that emits light; a first reflecting unit having a first reflecting surface that reflects the light emitted by the emission unit toward a document; a second reflecting unit having a second reflecting surface that reflects the light reflected by the first reflecting unit and specularly reflected by the document; a first support unit that supports the first reflecting unit and the second reflecting unit and fixes a relative position and a relative orientation between the first reflecting surface and the second reflecting surface; and a second support unit that supports the first support unit such that at least one of a position and an orientation of the first support unit is adjustable.

BRIEF DESCRIPTION OF THE DRAWINGS

An exemplary embodiment of the present disclosure will be described in detail based on the following figures, wherein.

DETAILED DESCRIPTION

1. Exemplary Embodiment

Figure 1:
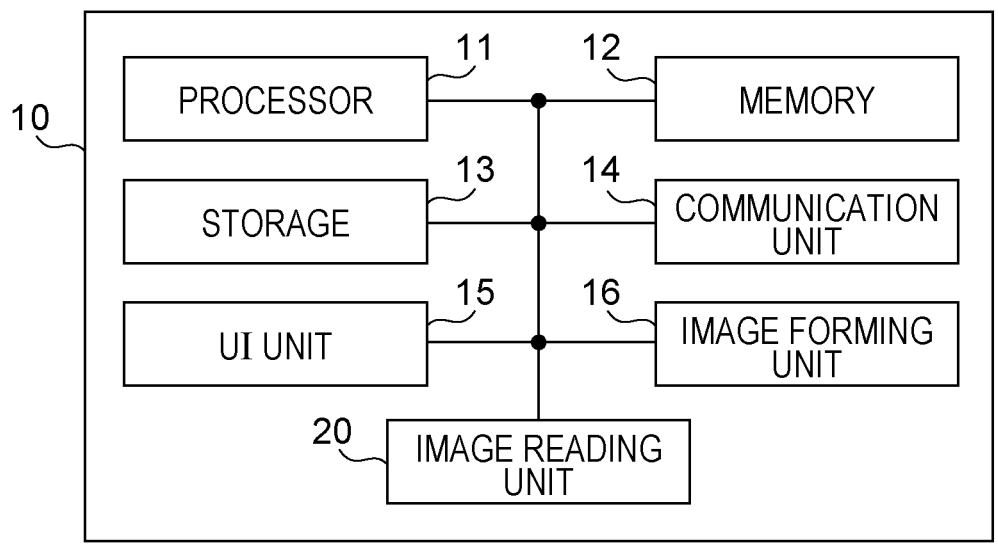
FIG. 1 illustrates a hardware structure of an image reading device according to an exemplary embodiment.

FIG. 1 illustrates a hardware structure of an image reading device 10 according to an exemplary embodiment. The image reading device 10 is a device that reads an image on a document. The image reading device 10 is an example of a "reading device" according to the present disclosure. In the present exemplary embodiment, the image reading device 10 includes a processor 11, a memory 12, a storage 13, a communication unit 14, a user interface (UI) unit 15, an image forming unit 16, and an image reading unit 20. The image reading device 10 may instead include only the image reading unit 20.

The processor 11 includes, for example, a computing device such as a central processing unit (CPU), a register, and peripheral circuits. The memory 12 is a recording medium from which data may be read by the processor 11, and includes a random access memory (RAM) and a read only memory (ROM). The storage 13 is a recording medium from which data may be read by the processor 11, and includes, for example, a hard disk drive or a flash memory.

The processor 11 controls operations of hardware devices by executing programs stored in the ROM or the storage 13 using the RAM as a work area. The communication unit 14 includes an antenna and a communication circuit, and provides communication through communication lines (not shown). The programs executed by the processor 11 may be obtained from an external device that communicates with the processor 11 through the communication unit 14.

The UI unit 15 is an interface provided to a user who uses the device (image reading device 10). The interface is a device that receives information input by the user and outputs information provided by the image reading device 10. The UI unit 15 includes, for example, a touch screen including a display that serves as display means and a touch panel provided on a surface of the display. The UI unit 15 displays an image and is operated by the user.

The image forming unit 16 forms an image on a medium, such as a paper sheet. In the present exemplary embodiment, the image forming unit 16 forms an image on a medium by the inkjet method. The method for forming an image is not limited to this, and an electrophotographic system, for example, may instead be employed.

The image reading unit 20 includes a light source, an optical system, and an image sensor, and reads an image on a document by causing light from the light source to be reflected by the document. The image reading unit 20 supplies document image data representing the image on the document that has been read to the processor 11. The processor 11 performs various processes (print process, facsimile transmission process, etc.) by using the supplied document image data.

Figure 2:
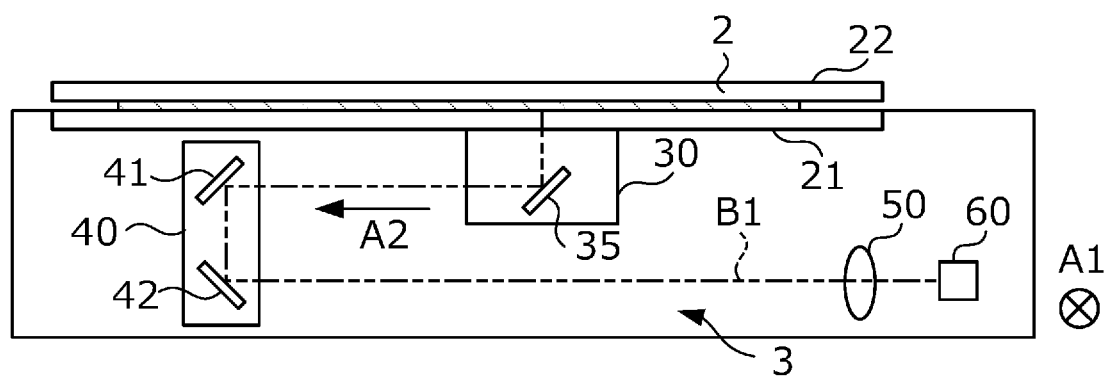
FIG. 2 illustrates the detailed structure of an image reading unit.

FIG. 2 illustrates the detailed structure of the image reading unit 20. FIG. 2 illustrates the image reading unit 20 viewed in a main scanning direction A1. The main scanning direction A1 is a direction from the near side to the far side of FIG. 2. The image reading unit 20 includes a document table 21, a document covering part 22, a carriage 30, a carriage 40, an imaging lens 50, and an image sensor 60.

The image reading unit 20 has the illustrated structure, which has a certain width in the main scanning direction A1. The carriage 30, the carriage 40, the imaging lens 50, and the image sensor 60 each have an elongated shape that extends in the main scanning direction A1. In FIG. 2, the direction shown by the arrow denoted by "A2" is a sub-scanning direction A2. The image reading unit 20 is a reading device having a so-called reduction optical system.

The document table 21 is a transparent glass plate that supports a document 2, on which an image to be read is formed. The document table 21 may instated be, for example, an acrylic plate as long as the document table 21 is a transparent plate-shaped member. The document covering part 22 covers the document table 21 to block external light, and the document 2 is placed between the document covering part 22 and the document table 21. The document 2 is supported in a stationary manner by the document table 21 and the document covering part 22.

When the document 2 is being read, the carriage 30 moves in the sub-scanning direction A2 at a predetermined speed. The carriage 30 includes emission units that emit light toward the document 2. The emission units will be described in detail below with reference to FIG. 3. The carriage 30 also includes a mirror 35. In the present exemplary embodiment, the carriage 30 is box-shaped and open at the top, and the mirror 35 is disposed in the carriage 30. The carriage 30 is not necessarily box-shaped, and may be hollow as long as the carriage 30 is movable together with the mirror 35. The mirror 35 reflects light reflected by the document 2. The reflected light is guided to an optical path B1 that extends to the image sensor 60.

When the document 2 is being read, the carriage 40 moves in the sub-scanning direction A2 at a speed that is half the speed of the carriage 30. The carriage 40 includes a mirror 41 and a mirror 42. The mirrors 41 and 42 reflect the light reflected by the mirror 35 to guide the light to the optical path B1. The imaging lens 50 focuses the light reflected by the mirror 42 on a predetermined position.

The image sensor 60 includes a light receiving element, such as a charge coupled device (CCD). The image sensor 60 receives light focused by the imaging lens 50 and generates an image signal corresponding to the received light. The image sensor 60 supplies the generated image signal to the processor 11 illustrated in FIG. 1. The processor 11 generates image data of the document 2 based on the supplied image signal.

Figure 3:
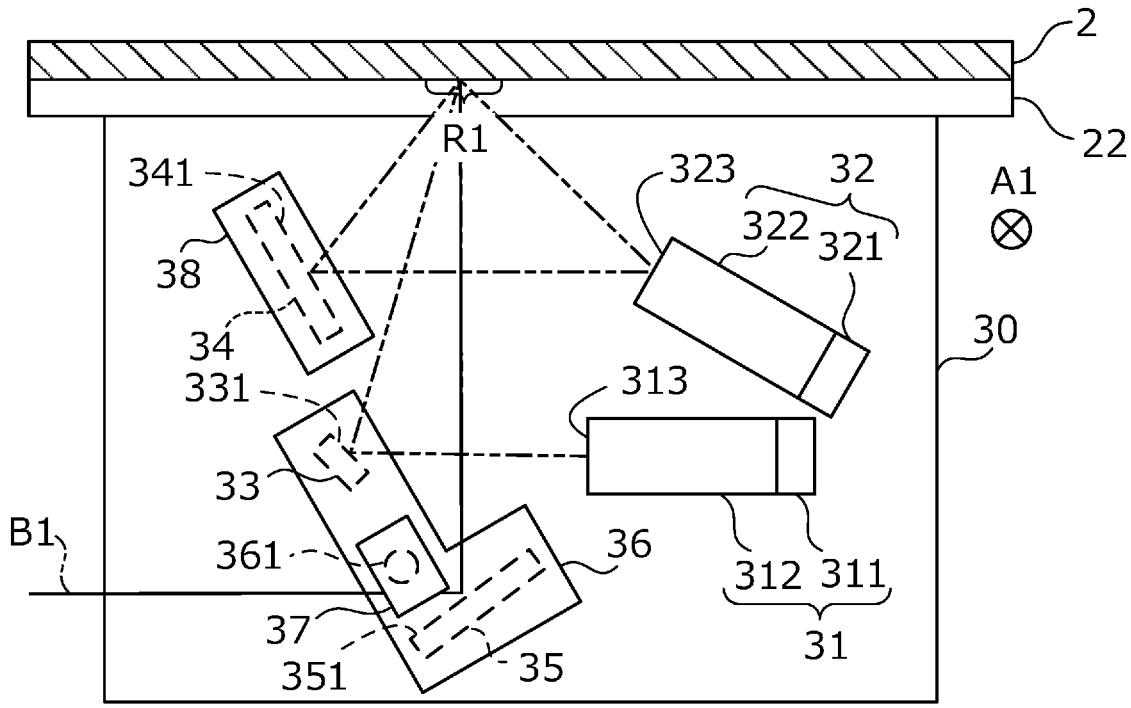
FIG. 3 is an enlarged view of a carriage.

FIG. 3 is an enlarged view of the carriage 30. The carriage 30 includes a specular-reflection light emission unit 31, a diffuse-reflection light emission unit 32, a specular-reflection reflector 33, a diffuse-reflection reflector 34, the mirror 35, a first support member 36, a second support member 37, and third support members 38.

The specular-reflection light emission unit 31 emits light to be specularly reflected by the document 2. The specular-reflection light emission unit 31 has an emission surface 313 from which light is emitted, and emits the light to be reflected by the document 2 from the emission surface 313. The diffuse-reflection light emission unit 32 emits light to be diffusely reflected by the document 2. The diffuse-reflection light emission unit 32 has an emission surface 323 from which light is emitted, and emits the light to be reflected by the document 2 from the emission surface 323. The specular-reflection light emission unit 31 is an example of an "emission unit" according to the present disclosure, and the diffuse-reflection light emission unit 32 is an example of a "second emission unit" according to the present disclosure.

The specular-reflection light emission unit 31 includes a light source 311 and a light guide 312. The light source 311 includes, for example, light emitting diodes (LEDs) that emit light. The light guide 312 is a transparent member that transmits light therethrough. The light guide 312 has the above-described emission surface 313, and guides the light from the light source 311 to the emission surface 313. The emission surface 313 is generally flat, but has fine irregularities so that diffused light is emitted.

The diffuse-reflection light emission unit 32 includes a light source 321 and a light guide 322. The light source 321 includes, for example, LEDs that emit light. The light guide 322 is a transparent member that transmits light therethrough. The light guide 322 has the above-described emission surface 323, and guides the light from the light source 321 to the emission surface 323. The emission surface 323 is generally flat, but has fine irregularities so that diffused light is emitted. The structure of the diffuse-reflection light emission unit 32 is similar to that of the specular-reflection light emission unit 31.

As illustrated in FIG. 3, part of the light emitted from the emission surface 313 reaches the specular-reflection reflector 33.

Figure 4:
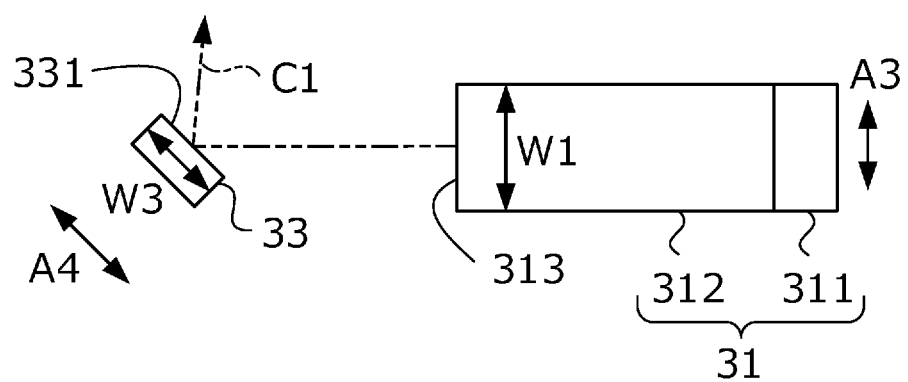
FIG. 4 is an enlarged view of a region including a reflector.

FIG. 4 is an enlarged view of a region including the specular-reflection reflector 33. The specular-reflection reflector 33 is a member having a reflecting surface 331 that reflects the light from the emission surface 313 toward a reading region R1 of the document 2 so that light for specular reflection is emitted toward the reading region R1. The light for specular reflection is light that is incident on the document at an angle such that a portion of light reflected by the document that travels from the document toward the image sensor is specularly reflected light. In other words, the light for specular reflection is light to be specularly reflected by the document 2.

The specular-reflection reflector 33 is an example of a "first reflecting unit" according to the present disclosure, and the reflecting surface 331 is an example of a "first reflecting surface" according to the present disclosure. In the present exemplary embodiment, the reflecting surface 331 is a flat surface. The emission surface 313 of the light guide 312 of the specular-reflection light emission unit 31 has a dimension W1 in a short-side direction A3. The short-side direction A3 is a direction that is orthogonal to the long-side direction of the emission surface 313, which is the main scanning direction A1, and extends along the emission surface 313.

Figure 5:
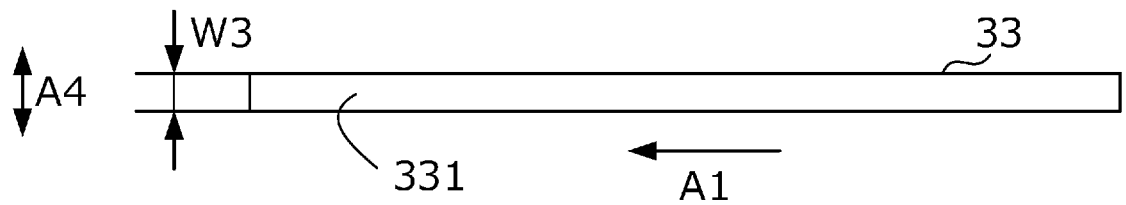
FIG. 5 is a front view of a reflecting surface.

FIG. 5 is a front view of the reflecting surface 331. As illustrated in FIG. 5, similar to the emission surface 313 of the light guide 312, the reflecting surface 331 of the specular-reflection reflector 33 has a long-side direction that is the main scanning direction A1, and is rectangular in front view. The size of the reflecting surface 331 is such that the dimension in a short-side direction A4 is dimension W3. The short-side direction A4 is a direction that is orthogonal to the long-side direction of the reflecting surface 331, which is the main scanning direction A1, and extends along the reflecting surface 331.

As illustrated in FIG. 3, part of the light emitted from the emission surface 323 of the light guide 322 reaches the diffuse-reflection reflector 34.

Figure 6:
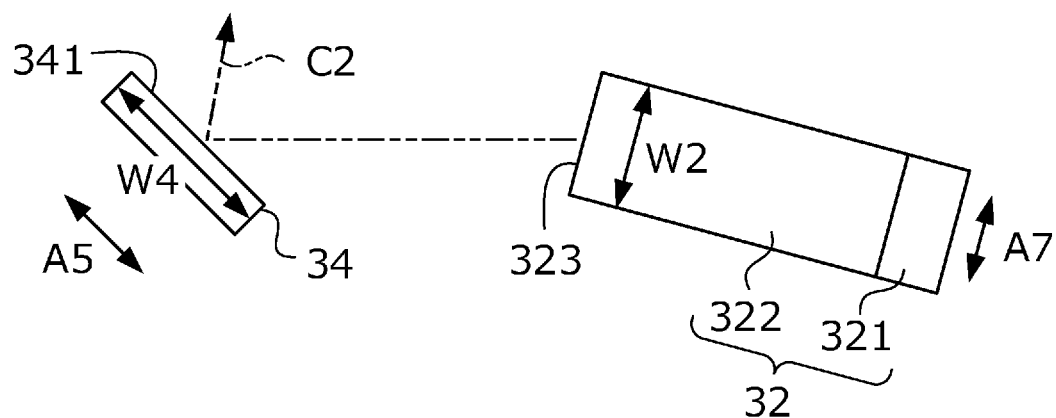
FIG. 6 is an enlarged view of a region including a reflector.

FIG. 6 is an enlarged view of a region including the diffuse-reflection reflector 34. The diffuse-reflection reflector 34 is a member having a reflecting surface 341 that reflects the light from the emission surface 323 toward the reading region R1 of the document 2 so that light for diffuse reflection, that is, light to be diffusely reflected by the document 2, is emitted toward the reading region R1.

Figure 7:
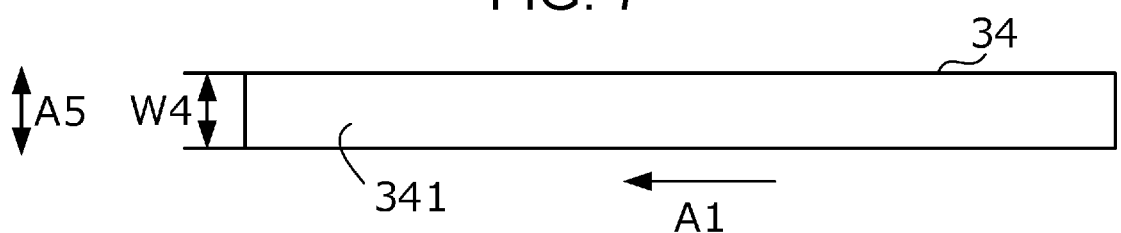
FIG. 7 is a front view of a reflecting surface.

FIG. 7 is a front view of the reflecting surface 341. As illustrated in FIG. 7, similar to the emission surface 323 of the light guide 322, the reflecting surface 341 of the diffuse-reflection reflector 34 has a long-side direction that is the main scanning direction A1, and is rectangular in front view. The size of the reflecting surface 341 is such that the dimension in a short-side direction A5 is dimension W4. The short-side direction A5 is a direction that is orthogonal to the long-side direction of the reflecting surface 341, which is the main scanning direction A1, and extends along the reflecting surface 341.

The emission surface 323 of the light guide 322 of the diffuse-reflection light emission unit 32 has a dimension W2 in a short-side direction A7. The short-side direction A7 is a direction that is orthogonal to the long-side direction of the emission surface 323, which is the main scanning direction A1, and extends along the emission surface 323.

When the light reflected by the reflecting surface 331 reaches the reading region R1 of the document 2, part of the light is specularly reflected by the document 2. The light that has been specularly reflected by the document 2 reaches the mirror 35 illustrated in FIG. 2. The mirror 35 has a reflecting surface 351 that reflects the light that has been reflected by the specular-reflection reflector 33 and specularly reflected by the document 2. The mirror 35 is an example of a "second reflecting unit" according to the present disclosure, and the reflecting surface 351 is an example of a "second reflecting surface" according to the present disclosure.

In the present exemplary embodiment, the mirror 35 is disposed substantially vertically below the reading region R1. Accordingly, even when, for example, the document 2 is raised, the image thereon may be read. When the mirror 35 is disposed vertically below the reading region R1 as in this case, the incident light needs to be directed from vertically below to enable the mirror 35 to receive completely specularly reflected light.

However, such an arrangement is structurally not possible. Therefore, in the present exemplary embodiment, the incident light is inclined at an angle of about 5 degrees with respect to the reading region R1. In other words, the specular-reflection reflector 33 is inclined at an angle of about 5 degrees with respect to the reading region R1. In this case, reflection characteristics of light that is substantially, although not completely, specularly reflected may be detected. The angle of inclination is not limited to 5 degrees as in the present exemplary embodiment, and an image based on light somewhat similar to specularly reflected light may be obtained when the angle of inclination is 9 degrees or less.

Figure 8:
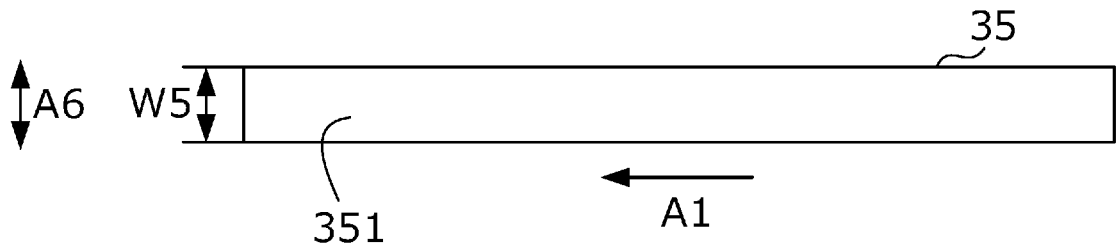
FIG. 8 is a front view of a reflecting surface.

FIG. 8 is a front view of the reflecting surface 351. As illustrated in FIG. 8, the reflecting surface 351 of the mirror 35 has a long-side direction that is the main scanning direction A1, and is rectangular in front view. The size of the reflecting surface 351 is such that the dimension in a short-side direction A6 is dimension W5. The short-side direction A6 is a direction that is orthogonal to the long-side direction of the reflecting surface 351, which is the main scanning direction A1, and extends along the reflecting surface 351.

The dimension W5 is greater than the dimension W3 of the reflecting surface 331 of the specular-reflection reflector 33 in the short-side direction A4. Since the dimension W5 is greater than the dimension W3, even when the optical path B1 for the light reflected by the document 2 is displaced due to, for example, allowable differences, the reflected light is more easily reflected by the reflecting surface 351 compared to when the dimension W5 is less than the dimension W3. The dimension W3 is not only less than the dimension W5, but is also less than the dimension W4. In addition, the dimension W3 is also less than the dimension W1. The dimension W4 is greater than the dimension W2. In the present exemplary embodiment, the dimension W1 is equal to the dimension W2. More specifically, the dimension W1 is 4.5 mm, and the dimension W3 is 2 mm.

The light reflected by the mirror 35 is guided by the mirror 41, the mirror 42, and the imaging lens 50 illustrated in FIG. 2 and reaches the image sensor 60. The mirror 35, the mirror 41, the mirror 42, and the imaging lens 50 function as an optical path unit 3 that defines the optical path B1 illustrated in FIG. 2 along which the light reflected by the reflecting surface 351 of the mirror 35 is guided. The image sensor 60 generates an image represented by the light guided by the optical path unit 3. The dimensions of the mirror 41 and the mirror 42, which correspond to the dimension W5 of the mirror 35, are greater than or equal to twice the dimension W3.

Part of the light emitted by the diffuse-reflection light emission unit 32 is reflected by the document 2 so that the reflected light represents an image. Part of the light emitted from the emission surface 323 of the light guide 322 included in the diffuse-reflection light emission unit 32 travels toward the diffuse-reflection reflector 34. The reflecting surface 341 of the diffuse-reflection reflector 34 reflects the light emitted by the diffuse-reflection light emission unit 32 toward the reading region R1 of the document 2.

The diffuse-reflection reflector 34 is positioned so that when the light that has been reflected by the reflecting surface 341 reaches the document 2, part of the light that is specularly reflected by the document 2 does not travel toward the optical path B1. Therefore, when the light that has been reflected by the reflecting surface 341 reaches the document 2, a portion of part of the light that is diffusely reflected by the document 2 travels toward the optical path B1, as illustrated in FIG. 3. The light that travels toward the optical path B1 as described above is guided along the optical path B1 illustrated in FIG. 2 by the optical path unit 3, and reaches the image sensor 60.

As described above, the diffuse-reflection light emission unit 32 is disposed so that the light emitted therefrom and diffusely reflected by the document 2 is guided to the image sensor 60 by the optical path unit 3. The optical path unit 3 includes one or more optical members that guide that the light specularly reflected by the document 2 and the light diffusely reflected by the document 2. The optical members are the mirror 41, the mirror 42, and the imaging lens 50 illustrated in FIG. 2. In the present exemplary embodiment, both the specularly reflected light and the diffusely reflected light are guided to the image sensor 60 by the optical path unit 3. Accordingly, the device (image reading device 10) may have a smaller size than when the specularly reflected light and the diffusely reflected light are guided by different optical path units.

Although the optical path B1 is provided as a shared optical path for guiding light to the image sensor 60, light is emitted at different timings. First, the image reading unit 20 turns on the diffuse-reflection light emission unit 32, moves the carriage 30 and the carriage 40 to an end of the document in the sub-scanning direction to read the document, and supplies document image data representing the image of the document based on the diffusely reflected light to the processor 11.

Subsequently, when the carriage 30 and the carriage 40 are returned from the end in the sub-scanning direction to the original position, the specular-reflection light emission unit 31 is turned on, the document is read, and document image data representing the image of the document based on the specularly reflected light is supplied to the processor 11. Thus, in the present exemplary embodiment, the image based on the specularly reflected light and the image based on the diffusely reflected light are individually obtained for a single document. The processor 11 performs a process for obtaining a single image from the two images by using the image data supplied thereto.

The image sensor 60 generates an image represented by the received light, that is, the light that has been diffusely reflected by the document 2. As described above, the image sensor 60 generates images based on both the light that is specularly reflected by the reading region R1 and the light that is diffusely reflected by the reading region R1.

Part of the light emitted from the emission surface 323 of the light guide 322 directly travels toward the reading region R1 of the document 2, and is diffusely reflected. Part of the diffusely reflected light travels toward the optical path B1. Thus, the diffuse-reflection light emission unit 32 emits light toward both the diffuse-reflection reflector 34 and the reading region R1. The image sensor 60 also generates an image based on the light that has directly reached the reading region R1 and been diffusely reflected after being emitted by the diffuse-reflection light emission unit 32.

The first support member 36 is a member that supports the specular-reflection reflector 33 and the mirror 35 and fixes the relative position and orientation between the reflecting surface 331 and the reflecting surface 351. The second support member 37 is a member that supports the first support member 36 such that at least one of the position and orientation of the first support member 36 is adjustable. The first support member 36 is an example of a "first support unit" according to the present disclosure, and the second support member 37 is an example of a "second support unit" according to the present disclosure.

Figure 9A:
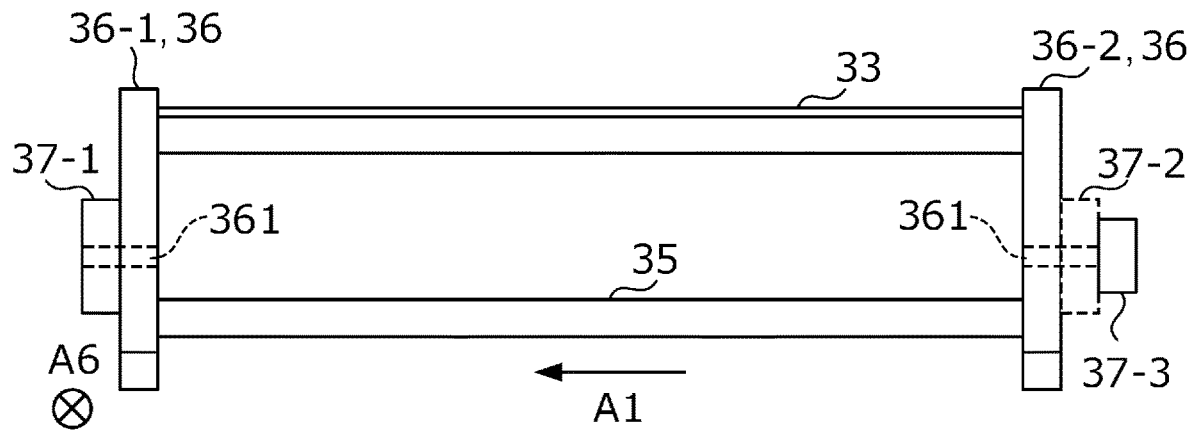
FIGS. 9A to 9C illustrate examples of a first support member and a second support member.
Figure 9B:
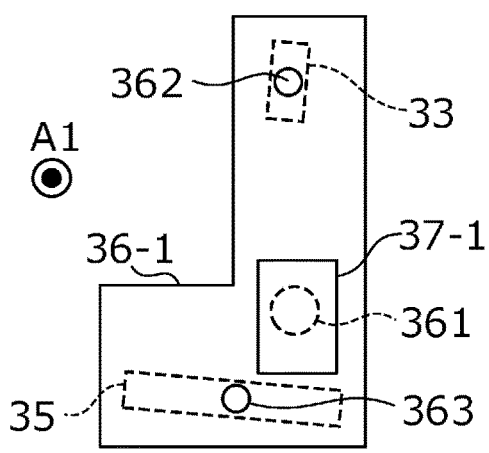
Figure 9C:
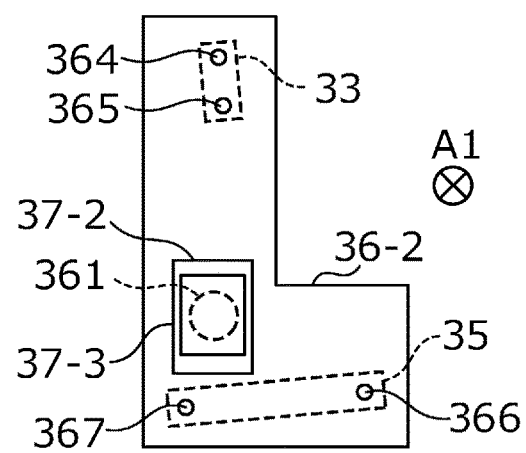

FIGS. 9A to 9C illustrate examples of the first support member 36 and the second support member 37. FIG. 9A illustrates the first support member 36, the second support member 37, the specular-reflection reflector 33, and the mirror 35 viewed in the short-side direction A6 of the mirror 35.

The first support member 36 includes a first member 36-1 that is plate-shaped and provided at the downstream side in the main scanning direction A1 and a second member 36-2 that is plate-shaped and provided at the upstream side in the main scanning direction A1. The downstream ends of the specular-reflection reflector 33 and the mirror 35 in the main scanning direction A1 are fixed to the first member 36-1, and the upstream ends of the specular-reflection reflector 33 and the mirror 35 in the main scanning direction A1 are fixed to the second member 36-2. Each of the first member 36-1 and the second member 36-2 includes a first rotating shaft 361.

The second support member 37 supports the first rotating shafts 361 of the first support member 36 in a rotatable manner so that the first support member 36 rotates about the first rotating shafts 361. The second support member 37 includes a first member 37-1 provided at the downstream side in the main scanning direction A1, a second member 37-2 that is plate-shaped and provided at the upstream side in the main scanning direction A1, and a driving unit 37-3. The first member 37-1 supports the first rotating shaft 361 of the first member 36-1 in a rotatable manner.

The second member 37-2 supports the first rotating shaft 361 of the second member 36-2 in a rotatable manner. The driving unit 37-3 includes, for example, a stepping motor, and rotates the first rotating shaft 361 supported by the second member 37-2 by a specified angle. The rotation angle is specified to the driving unit 37-3 by, for example, an external computer (for example, a notebook personal computer) connected to the image reading device 10.

FIG. 9B illustrates the first member 36-1 and the first member 37-1 viewed from the downstream side in the main scanning direction A1, and FIG. 9C illustrates the second member 36-2, the second member 37-2, and the driving unit 37-3 viewed from the upstream side in the main scanning direction A1. The first member 36-1 includes a second rotating shaft 362 and a third rotating shaft 363 in addition to the above-described first rotating shaft 361. The first rotating shaft 361 of the first member 36-1 is rotatably supported by the first member 37-1.

One end of the specular-reflection reflector 33 in the main scanning direction A1 (downstream end in the main scanning direction A1) is rotatably supported by the second rotating shaft 362 of the first member 36-1. One end of the mirror 35 in the main scanning direction A1 (downstream end in the main scanning direction A1) is rotatably supported by the third rotating shaft 363 of the first member 36-1. The second rotating shaft 362 and the third rotating shaft 363 are rotated when, for example, a dedicated jig is attached thereto and operated.

The first rotating shaft 361 of the second member 36-2 is rotatably supported by the second member 37-2. The second member 36-2 rotates about the first rotating shaft 361 when driving force is transmitted from the driving unit 37-3. When the first support member 36 itself is rotated by the driving force transmitted from the driving unit 37-3 as described above, the positions and orientations of two reflecting surfaces, which are the reflecting surface 331 of the specular-reflection reflector 33 and the reflecting surface 351 of the mirror 35, with respect to the optical path and the document may be adjusted with a single adjustment process without changing the relationship between the two reflecting surfaces.

In the present exemplary embodiment, an adjustment is made so that the optical path from the reading region R1 to the mirror 35 extends vertically downward. When the mirror 35 is thus adjusted, light emitted from the specular-reflection reflector 33 is reliably incident on the mirror 35 because the mirror 35 and the specular-reflection reflector 33 are positioned relative to each other in advance. In particular, when the specular-reflection reflector 33 is small as in the present exemplary embodiment, there is a risk that the light that is specularly reflected by the document will travel toward a position where the mirror 35 is not placed and cannot be detected unless the above-described structure is provided.

In addition, as described above, the first support member 36 is provided with the driving unit 37-3 that rotates the first support member 36 about the first rotating shafts 361 only at one of the ends in the main scanning direction A1 at the upstream side in the main scanning direction A1. The positional accuracies of the specular-reflection reflector 33 and the mirror 35 supported by the first support member 36 tend to be higher at the upstream side in the main scanning direction A1, at which the driving unit 37-3 is provided, than at the downstream side.

The document is positioned with reference to the upstream end of the document table 21 in the main scanning direction A1. Therefore, image reading is performed for the document of any size at the upstream end of the document table 21 in the main scanning direction A1. In contrast, image reading is not performed at the downstream end of the document table 21 in the main scanning direction A1 when the size of the document is small. According to the present exemplary embodiment, since the driving unit 37-3 is provided at the upstream side in the main scanning direction A1 as described above, every document receives the benefits of high image reading accuracy.

The first member 36-1 and the second member 36-2 are each configured such that the first rotating shaft 361 is closer to the reflecting surface 351 of the mirror 35 than to the reflecting surface 331 of the specular-reflection reflector 33. Therefore, when, for example, the first support member 36 is rotated about the first rotating shaft 361, the distance by which the mirror 35 is moved is less than the distance by which the specular-reflection reflector 33 is moved. Thus, the specular-reflection reflector 33 is moved by a longer distance than the mirror 35 is.

As a result, compared to the case where the first rotating shafts 361 are closer to the reflecting surface 331 than to the reflecting surface 351, the specular-reflection reflector 33 is moved by a larger amount, and therefore there is a greater change in the quality of the image based on the specularly reflected light. In addition, the mirror 35 is moved by a smaller amount, and therefore there is a smaller change in components of the diffusely reflected light that travel along the optical path B1. Here, the components are represented by, for example, distribution of the amounts of light of the reflected light rays. The diffusely reflected light is emitted in various directions, and therefore originally causes smaller changes in components than the specularly reflected light does when the mirror 35 is moved.

The second member 36-2 includes a fixing member 364, a fixing member 365, a fixing member 366, and a fixing member 367. Each fixing member is, for example, a screw-shaped part that extends through and projects from the second member 36-2 to contact and fix the specular-reflection reflector 33 or the mirror 35 with the projecting portion thereof. The fixing members 364 and 365 fix the upstream end of the specular-reflection reflector 33 in the main scanning direction A1. The fixing members 366 and 367 fix the upstream end of the mirror 35 in the main scanning direction A1.

Thus, the first support member 36 fixes the specular-reflection reflector 33 and the mirror 35 by supporting one end of each of the specular-reflection reflector 33 and the mirror 35 in the main scanning direction A1 (downstream end in the main scanning direction A1) in a rotatable manner and being in contact with the other end of each of the specular-reflection reflector 33 and the mirror 35 (upstream end in the main scanning direction A1). Accordingly, each of the specular-reflection reflector 33 and the mirror 35 is arranged such that the orientation of the reflecting surface thereof is changeable by an operation performed only at one of the ends thereof in the long-side direction that is rotatably supported.

The document is positioned with reference to the upstream end of the document table 21 in the main scanning direction A1. Therefore, image reading is performed for the document of any size at the upstream end of the document table 21 in the main scanning direction A1. In contrast, image reading is not performed at the downstream end of the document table 21 in the main scanning direction A1 when the size of the document is small.

Each of the specular-reflection reflector 33 and the mirror 35 may be more accurately positioned when in contact with and fixed by the first support member 36 at two or more positions than at one position. In the present exemplary embodiment, each of the specular-reflection reflector 33 and the mirror 35 is in contact with and fixed by the first support member 36 at two or more positions at the upstream end in the main scanning direction A1 where image reading is always performed. Therefore, every document receives the benefits of high image reading accuracy.

The third support members 38 are members that support the diffuse-reflection reflector 34.

Figure 10:
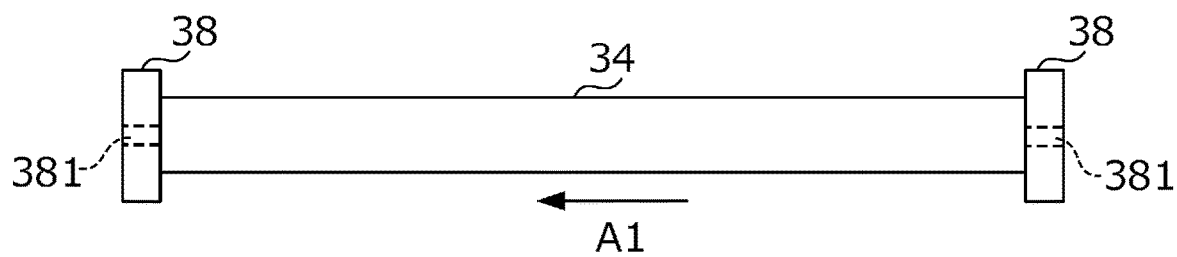
FIG. 10 illustrates an example of third support members.

FIG. 10 illustrates an example of the third support members 38. FIG. 10 illustrates the third support members 38 and the diffuse-reflection reflector 34. Each third support member 38 includes a rotating shaft 381. The third support members 38 are rotatably supported by the rotating shafts 381 in the housing of the device (image reading device 10). The orientation of the diffuse-reflection reflector 34 is adjusted by rotating the third support members 38.

The positions at which the rotating shafts 381 are attached to the housing are adjustable. Accordingly, the positional relationship between the diffuse-reflection reflector 34 and the mirror 35 is adjustable. As described above, the diffuse-reflection reflector 34 is supported by a member different from the member that supports the specular-reflection reflector 33 and the mirror 35, so that the position and orientation thereof may be adjusted independently of those of the specular-reflection reflector 33 and the mirror 35.

The specular-reflection reflector 33 and the mirror 35 are both supported by the first support member 36. Therefore, the positions and orientations of the specular-reflection reflector 33 and the mirror 35, which are reflecting units that reflect light before and after the light reaches the reading region R1, with respect to the reading region R1 may be adjusted without changing the positional relationship between the reflecting units. Since it is not necessary to adjust the positional relationship between the reflecting units, positioning of the reflecting units is facilitated.

2. Modifications

The above-described exemplary embodiment is merely an example of the present disclosure, and may be modified as described below. The exemplary embodiment and each modification may be realized in combination with each other.

2-1. Position of Mirror

In the above-described exemplary embodiment, an adjustment is made so that light travels vertically downward from the reading region R1 toward the mirror 35. However, the adjustment is not limited to this. When the angles of the specular-reflection reflector 33 and the mirror 35 are changed, specularly reflected light is continuously obtained, but the ratio of the specularly reflected light contained in the reflected light changes because the incident angle at which the light from the specular-reflection reflector 33 is incident on the reading region R1 and the reflection angle at which light is reflected toward the mirror 35 by the reading region R1 are changed.

When the ratio of the specularly reflected light changes, the quality of the image output based on the specularly reflected light also changes. Accordingly, based on such a characteristic, for example, an adjustment may be made such that the incident angle and the reflection angle are equal to each other when the influence of the specularly reflected light component on the output image is to be increased. In contrast, when the document causes a large specularly reflected light component and when the influence of the specularly reflected light is to be somewhat reduced, the incident angle and the reflection angle may be set to have a difference therebetween to reduce the specularly reflected light.

Instead of making an adjustment based on the state of the document to be read as described above, the above-described adjustments may be applied in combination. For example, an adjustment may be made by the driving unit such that light travels vertically downward from the reading region R1 to the mirror 35 when a book document is read, and such that the incident angle and the reflection angle are equal to each other when a glossy document is read.

2-2. Reflector

Although the reflecting surface 331 of the specular-reflection reflector 33 for the light to be specularly reflected and the reflecting surface 341 of the diffuse-reflection reflector 34 for the light to be diffusely reflected are flat in the exemplary embodiment, the reflecting surfaces are not limited to this. For example, the reflecting surface 331 may instead have a shape such that the light emitted from the emission surface 313 of the light guide 312 is reflected so that convergent light is directed toward the document 2 (generally a concave shape).

Convergent light is light that converges toward a predetermined focal point. The focal point may be on the document or at a position in front of or behind the document. The reflecting surface 331 may instead have a shape such that the light emitted from the emission surface 313 of the light guide 312 is reflected so that divergent light is directed toward the document 2 (generally a convex shape). Divergent light is light that spreads instead of converging toward a predetermined focal point. The reflecting surface 341 of the diffuse-reflection reflector 34 may also be a concave or convex surface.

2-3. Incident Light

In the above-described exemplary embodiment, the specular-reflection reflector 33 reflects the light from the emission unit so that light other than the light reflected by the specular-reflection reflector 33 is not incident on the reading region R1 of the document 2. However, light may instead be directly incident on the reading region R1 of the document 2 without being reflected. In the above-described exemplary embodiment, plural LEDs are arranged in the long-side direction. Alternatively, however, a light guide that extends in a long-side direction may be provided, and a power LED may be provided at an end of the light guide in the long-side direction. Instead of using the light guide, light emitted from plural LEDs arranged in the long-side direction may be directly directed toward the document.

2-4. Angles

In the above-described exemplary embodiment, the angles of the incident light and the reflected light are set to small angles. However, the angles are not limited to this as long as the specularly reflected light may be guided to the image sensor 60. In addition, although the members that emit the light to be diffusely reflected (emission unit and reflector) are closer to the document than the members that emit the light to be specularly reflected in the above-described exemplary embodiment, the members that emit the light to be diffusely reflected may instead be farther from the document. In such a case, for example, the incident angle and the emission angle of the specularly reflected light may be, for example, 40° with respect to the document. Thus, the optical paths toward and from the document may be spaced farther apart from each other than when the angles are set to be as close to 0° as possible. Accordingly, the components may be more easily arranged.

Although the diffuse-reflection light emission unit 32 is disposed on the same side of the optical path as the specular-reflection light emission unit 31, the diffuse-reflection light emission unit 32 may instead be disposed on a side of the optical path different from the side at which the specular-reflection light emission unit 31 is disposed.

Figure 11:
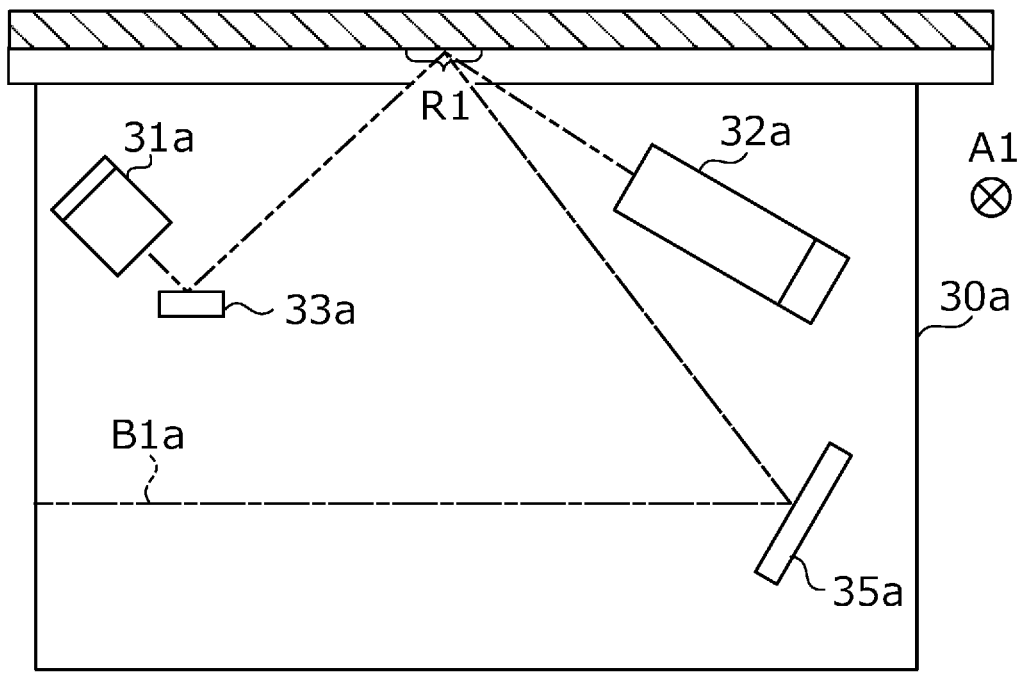
FIG. 11 is an enlarged view of a carriage according to a modification.

FIG. 11 is an enlarged view of a carriage 30*a* according to such a modification. The carriage 30*a* includes a specular-reflection light emission unit 31*a*, a diffuse-reflection light emission unit 32*a*, a specular-reflection reflector 33*a*, and a mirror 35*a*.

The specular-reflection light emission unit 31*a* and the diffuse-reflection light emission unit 32*a* are disposed on different sides of an optical path B1*a*. Light emitted by the specular-reflection light emission unit 31*a* is reflected by the specular-reflection reflector 33*a* and is incident on a reading region R1. The diffuse-reflection light emission unit 32*a* emits light directly toward the reading region R1 of the document 2 without using a reflector. In the example illustrated in FIG. 11, the vertical height of the reading device with respect to the document 2 is less than that in the case where a light source is disposed vertically below the reading region R1.

2-5. Optical Axis

In the above-described exemplary embodiment, an optical axis C1 is positioned at the center of the optical path. However, the optical axis C1 may instead be included in the optical path but shifted toward one side, or be excluded from the optical path.

Figure 12:
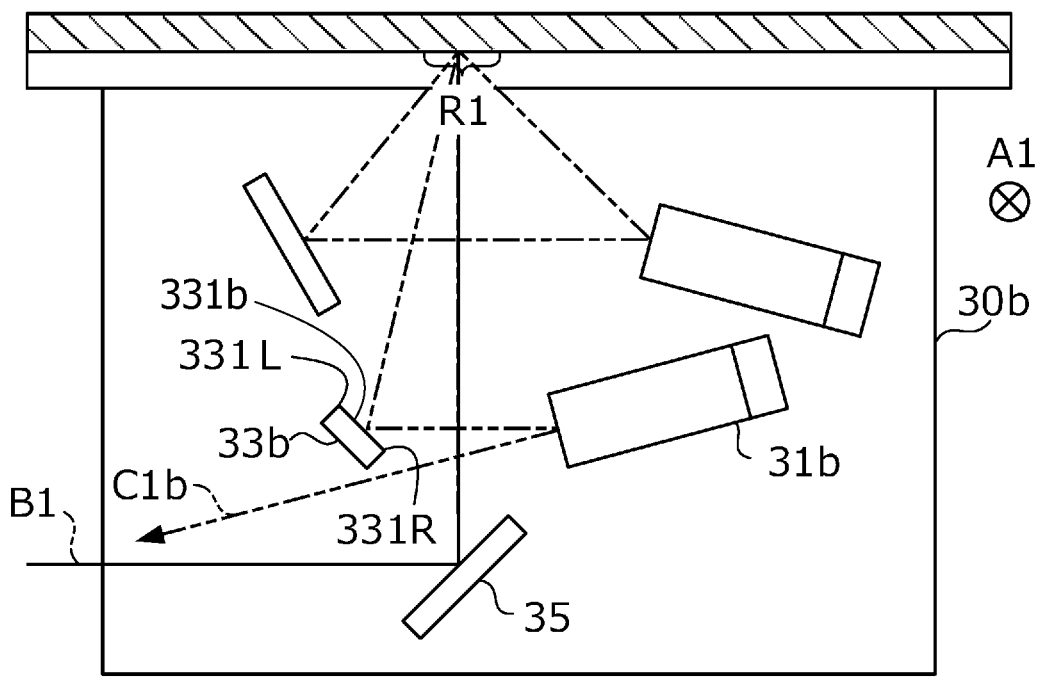
FIG. 12 is an enlarged view of a carriage according to another modification.

FIG. 12 is an enlarged view of a carriage 30*b* according to such a modification. The carriage 30*b* includes, instead of the specular-reflection light emission unit 31 illustrated in FIG. 3, a specular-reflection light emission unit 31*b* having an optical axis C1*b* extending in a direction shifted from a specular-reflection reflector 33*b*.

Amounts of light reflected by a left end region 331L and a right end region 331R of a reflecting surface 331*b* of the specular-reflection reflector 33*b* will now be described with reference to FIG. 13.

Figure 13:
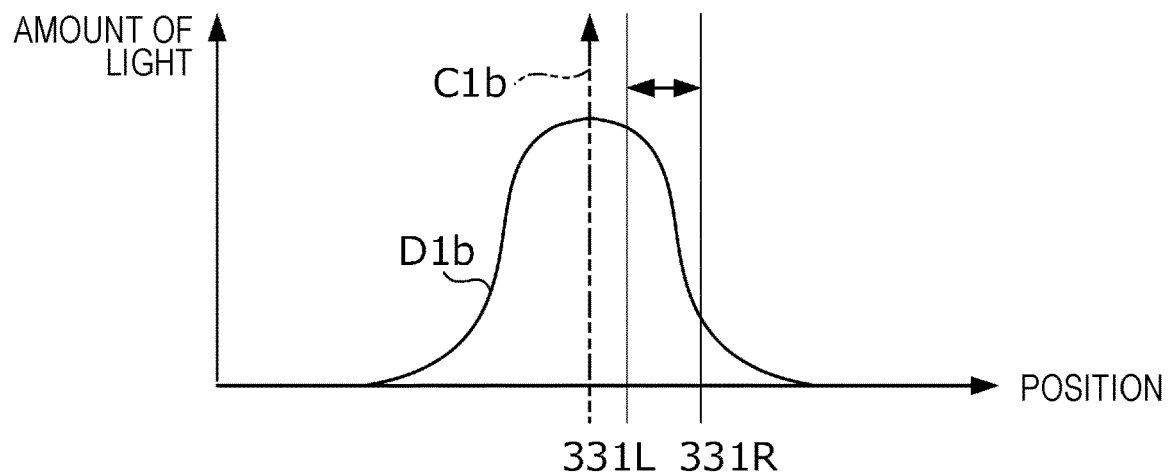
FIG. 13 is a graph showing an example of distribution of the amount of light emitted by a specular-reflection light emission unit.

FIG. 13 illustrates an example of a distribution of the amount of light emitted by the specular-reflection light emission unit 31*b*. FIG. 13 is a graph showing a distribution D1*b* of the amount of light along a plane positioned at a predetermined distance from the specular-reflection light emission unit 31*b* as viewed in the main scanning direction A1.

Referring to the example of FIG. 13, the amount of light reflected by the left end region 331L is greater than the amount of light reflected by the right end region 331R. The optical axis C1*b* is not included in the light reflected by the specular-reflection reflector 33*b*. The optical axis C1*b* may instead be included in the light reflected by the specular-reflection reflector 33*b* and shifted toward one side (toward the left end region 331L or the right end region 331R).

In the example illustrated in FIG. 12, the amount of light is uneven in the optical path along which the light reflected by the specular-reflection reflector 33*b* is guided to the reading region R1 of the document. A portion where the amount of light is large (optical path of light reflected by the left end region 331L) is disposed closer to a position where reflection of light by the document is close to complete specular reflection than a portion where the amount of light is small (optical path of light reflected by the right end region 331R).

When the optical path is disposed such that the optical axis is excluded therefrom or shifted toward one side thereof, the amount of light that travels toward the document 2 tends to be less even than when the optical axis is at the center of the optical path. Therefore, among the regions in the optical path of the light toward the document, the left end region 331L, from which a larger amount of light is emitted, may be disposed such that light therefrom is incident at an angle closer to the angle for specular reflection and that light from the right end region 331R, from which a smaller amount of light is emitted, is incident at an angle more different from the angle for specular reflection.

For example, when the specular-reflection reflector 33*b* reflects only a portion of the emitted light, an end at which an angle closer to the specular reflection angle is obtained may be set as the left end region 331L, and an end at which an angle more different from the specular reflection angle is obtained may be set as the right end region 331R. In such a case, the ratio of the specularly reflected light is higher than that in the case where the end at which the angle closer to the specular reflection angle is obtained is set as the right end region 331R.

2-6. Light Emission Unit

The shape of each light emission unit is not limited to that described in the exemplary embodiment. For example, the emission surface of each light emission unit may have a shape other than a rectangular shape. In addition, each light emission unit may have two or more emission surfaces instead of one emission surface.

Figure 14:
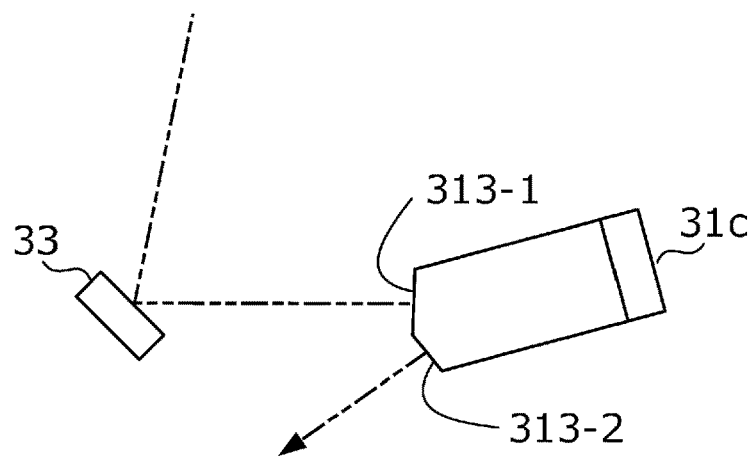
FIG. 14 illustrates a specular-reflection light emission unit according to a modification.

FIG. 14 illustrates a specular-reflection light emission unit 31*c* according to such a modification. The specular-reflection light emission unit 31*c* includes a first emission surface 313-1 and a second emission surface 313-2, and emits light from each emission surface. In the example illustrated in FIG. 14, the specular-reflection light emission unit 31*c* is disposed such that light emitted from the first emission surface 313-1 travels toward the specular-reflection reflector 33. Thus, the first emission surface 313-1 corresponds to the emission surface 313 of the specular-reflection light emission unit 31 in the above-described exemplary embodiment. In other words, the specular-reflection reflector 33 reflects a portion of light from the first emission surface 313-1.

In the structure illustrated in FIG. 14, light emitted from the second emission surface 313-2 does not travel toward the specular-reflection reflector 33 or the document. In this modification, although light is emitted from the second emission surface 313-2, the second emission surface 313-2 is not formed for the purpose of emitting light. The specular-reflection light emission unit 31*c* may instead be disposed such that light emitted from the second emission surface 313-2 travels toward the document.

Two or more emission surfaces may be formed as emission surfaces that correspond to the emission surface 313 of the specular-reflection light emission unit 31 according to the above-described exemplary embodiment. In such a case, light emitted from two of the emission surfaces that emit light that travels toward the specular-reflection reflector 33 may be reflected by, for example, the specular-reflection reflector 33 so that only a portion of the light travels toward the document.

2-7. 1× Magnification Optical System

Although the reading device has a reduction optical system in the above-described exemplary embodiment, the reading device may instead have a 1× magnification optical system. The 1× magnification optical system may be, for example, a contact image sensor (CIS) having an integrated structure including an LED light source that emits light; a Selfoc (registered trademark) lens that is a 1× magnification lens that transmits light reflected by the document 2; and a light receiving element provided on an extension from the Selfoc (registered trademark) lens.

Since the CIS includes the Selfoc (registered trademark) lens, it may be difficult to set the angles of the incident light and the reflected light to small angles as in the above-described exemplary embodiment. In such a case, the arrangement may be such that the angles of the incident light and the reflected light are equal to each other and are, for example, 45° with respect to the document. Also, a slit may be provided between the LED light source and the document to regulate the incident light.

2-8. Reading Device

Although the reading device that reads the document placed on the document table is described in the exemplary embodiment, the reading device is not limited to this. For example, the reading device may instead include an inline sensor disposed at a certain position in a transporting direction in which the document is transported, and read the document, which is a paper sheet, while the paper sheet is being transported. In the above-described exemplary embodiment, a single document is subjected to two reading processes: a reading process in which a specular-reflection light source is turned on and a reading process in which a diffuse-reflection light source is turned on.

In the case where an inline sensor is employed, image sensors may be provided individually for the specular-reflection light source and the diffuse-reflection light source, and the reading processes may be performed at different positions in the transporting direction. Alternatively, the diffuse-reflection light source and the specular-reflection light source may be selectively turned on depending on the desired reading mode. For example, the diffuse-reflection light source may be turned on when chromaticity is to be preferentially determined, and the specular-reflection light source may be turned on when glossiness is to be preferentially determined. It is not necessary that all of the documents that are transported be read. In product inspection, for example, the diffuse-reflection light source and the specular-reflection light source may be switched at intervals of a certain number of sheets instead of performing total inspection.

2-9. Output Apparatus

The result of the reading process performed by the image reading device 10 may be output.

Figure 15:
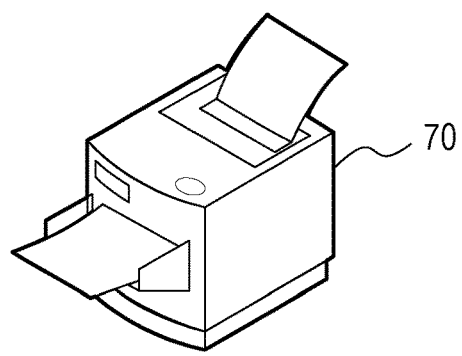
FIG. 15 illustrates an image forming apparatus according to a modification.

FIG. 15 illustrates an image forming apparatus 70 of such a modification. The image forming apparatus 70 includes the image reading device 10 illustrated in FIG. 2. The greater the intensity of the light that is specularly reflected by the reading region, the higher the glossiness of the reading region. Accordingly, the level of glossiness at each position of the document may be calculated by, for example, the CPU. In this case, the difference between the specularly reflected light and the diffusely reflected light may also be used for the calculation.

The image forming apparatus 70 forms an image by the inkjet method based on image data reflecting the result of the calculation. As described above, the image forming apparatus 70 outputs the level of specular reflection based on the specularly reflected light received in the image reading device 10. More specifically, the image forming apparatus 70 outputs an image formed based on the level of specular reflection based on the specularly reflected light received in the image reading device 10. Instead of being output by the image forming apparatus 70, the image may be processed based on the level of glossiness and output on a display device, such as a screen of a PC or a tablet.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
   an emission unit comprising a light source configured to emit light;
   a first reflector having a first reflecting surface that reflects the light emitted by the emission unit toward a document;
   a second reflector having a second reflecting surface that reflects the light reflected by the first reflecting unit and specularly reflected by the document;
   a first support unit configured to support the first reflector and the second reflector and fix a relative position and a relative orientation between the first reflecting surface and the second reflecting surface; and
   a second support unit configured to support the first support unit such that at least one of a position and an orientation of the first support unit is adjustable.

2. The reading device according to claim 1, wherein the first support unit includes a rotating shaft, and the second support unit is configured to rotate the first support unit about the rotating shaft.

3. The reading device according to claim 2, wherein the rotating shaft is closer to the second reflecting surface than to the first reflecting surface.

4. The reading device according to claim 3, wherein the first support unit is provided with a motor that rotates the first support unit about the rotating shaft at one of ends in a main scanning direction at an upstream side in the main scanning direction.

5. The reading device according to claim 4, wherein each of the first reflecting surface and the second reflecting surface is shaped such that a long-side direction thereof is the main scanning direction, and a dimension of the first reflecting surface in a short-side direction is less than a dimension of the second reflecting surface in the short-side direction.

6. The reading device according to claim 4, wherein the reading device comprises an optical path unit that includes the second reflecting surface and that defines an optical path that extends from the document to an image sensor.

7. The reading device according to claim 3, wherein each of the first reflecting surface and the second reflecting surface is shaped such that a long-side direction thereof is a main scanning direction, and a dimension of the first reflecting surface in a short-side direction is less than a dimension of the second reflecting surface in the short-side direction.

8. The reading device according to claim 3, wherein the reading device comprises an optical path unit that includes the second reflecting surface and that defines an optical path that extends from the document to an image sensor.

9. The reading device according to claim 2, wherein the first support unit is provided with a motor that rotates the first support unit about the rotating shaft at one of ends in a main scanning direction at an upstream side in the main scanning direction.

10. The reading device according to claim 9, wherein each of the first reflecting surface and the second reflecting surface is shaped such that a long-side direction thereof is the main scanning direction, and a dimension of the first reflecting surface in a short-side direction is less than a dimension of the second reflecting surface in the short-side direction.

11. The reading device according to claim 9, wherein the reading device comprises an optical path unit that includes the second reflecting surface and that defines an optical path that extends from the document to an image sensor.

12. The reading device according to claim 2, wherein each of the first reflecting surface and the second reflecting surface is shaped such that a long-side direction thereof is a main scanning direction, and a dimension of the first reflecting surface in a short-side direction is less than a dimension of the second reflecting surface in the short-side direction.

13. The reading device according to claim 2, wherein the reading device comprises an optical path unit that includes the second reflecting surface and that defines an optical path that extends from the document to an image sensor.

14. The reading device according to claim 1, wherein each of the first reflecting surface and the second reflecting surface is shaped such that a long-side direction thereof is a main scanning direction, and a dimension of the first reflecting surface in a short-side direction is less than a dimension of the second reflecting surface in the short-side direction.

15. The reading device according to claim 14, wherein the reading device comprises an optical path unit that includes the second reflecting surface and that defines an optical path that extends from the document to an image sensor.

16. The reading device according to claim 1, wherein the reading device comprises an optical path unit that includes the second reflecting surface and that defines an optical path that extends from the document to an image sensor.

17. The reading device according to claim 16, further comprising:
   a second emission unit comprising a light source configured to emit light and that is disposed such that the light emitted by the second emission unit and diffusely reflected by the document is guided to the image sensor by the optical path unit.

18. The reading device according to claim 17, wherein the optical path unit includes, in addition to the second reflector, one or more reflectors that reflect both the light specularly reflected by the document and the light diffusely reflected by the document, and a position and an orientation of each of the one or more reflectors are fixed.

19. An output apparatus comprising:
the reading device according to claim 1,
wherein the output apparatus outputs a level of specular reflection based on specularly reflected light received in the reading device.

20. An image forming apparatus comprising:
the output apparatus according to claim 19,
wherein the image forming apparatus outputs an image formed based on the level of specular reflection output by the output apparatus.

* * * * *